(12) United States Patent
Clavette

(10) Patent No.: US 7,573,250 B2
(45) Date of Patent: Aug. 11, 2009

(54) METHOD AND APPARATUS FOR CALIBRATING A RAMP SIGNAL

(75) Inventor: Danny R Clavette, Greene, RI (US)

(73) Assignee: International Rectifier Corporation, El Segundo, CA (US)

( * ) Notice: Subject to any disclaimer, the term of this patent is extended or adjusted under 35 U.S.C. 154(b) by 341 days.

(21) Appl. No.: 11/207,509

(22) Filed: Aug. 19, 2005

(65) Prior Publication Data

US 2006/0043956 A1    Mar. 2, 2006

Related U.S. Application Data

(60) Provisional application No. 60/604,176, filed on Aug. 24, 2004.

(51) Int. Cl.
*G05F 1/00*     (2006.01)
*H03K 4/06*     (2006.01)
(52) U.S. Cl. .................. 323/288; 327/132; 327/137
(58) Field of Classification Search ......... 323/282–288; 327/126, 131–137
See application file for complete search history.

(56) References Cited

U.S. PATENT DOCUMENTS

| 3,883,756 | A | * | 5/1975 | Dragon | 327/176 |
| 4,806,842 | A | * | 2/1989 | Bittner | 323/222 |
| 5,973,522 | A | * | 10/1999 | Coy et al. | 327/132 |
| 6,057,675 | A | * | 5/2000 | Tateishi | 323/283 |
| 6,597,159 | B2 | * | 7/2003 | Yang | 323/283 |
| 6,826,063 | B2 | * | 11/2004 | Ichikawa et al. | 363/41 |
| 6,838,916 | B2 | * | 1/2005 | Premont et al. | 327/132 |
| 6,903,536 | B2 | * | 6/2005 | Yang | 323/266 |
| 2004/0120395 | A1 | * | 6/2004 | Orr et al. | 375/237 |

FOREIGN PATENT DOCUMENTS

| JP | H03-007066 | 1/1991 |
| JP | H07-036670 | 2/1995 |
| JP | H01-233897 | 9/1998 |

OTHER PUBLICATIONS

Yasushi, Katayama and Satoshi, Sugahara,."Low-Noise DC-DC Converter IC using Spread-Spectrum PWM Control," The Institute of Electronics Information and Communication Engineers Technical Report. Technical Report of IEICE. Japan. The Institute of Electronics Information and Communication Engineers. Oct. 18, 2002. vol. 102. No. 475. pp. 67-72.

* cited by examiner

*Primary Examiner*—Jessica Han
*Assistant Examiner*—Emily Pham
(74) *Attorney, Agent, or Firm*—Farjami & Farjami LLP

(57) ABSTRACT

A circuit for calibrating an oscillating ramp signal to a variable DC reference signal in accordance with an embodiment of the present application includes a circuit for setting a predetermined time period during which a charging capacitor can charge and thus determining a ramp oscillator frequency; a variable current source for providing a charging current to the charging capacitor; a circuit for selecting the charging current fed by the variable current source to said charging capacitor; and a circuit for comparing the oscillating ramp signal to the variable DC reference signal and for supplying a signal to the selecting circuit for controlling the amount of current supplied to said charging capacitor thereby determining the charging voltage across said capacitor at the end of said predetermined time period.

21 Claims, 6 Drawing Sheets

METHOD AND APPARATUS FOR CALIBRATING A RAMP SIGNAL

CROSS-REFERENCE TO RELATED APPLICATIONS

The present application claims the benefit and priority of U.S. Provisional Application Ser. No. 60/604,176, filed Aug. 24, 2004 entitled IR 1150 RAMP CYCLE-BY-CYCLE CALIBRATION SCHEME, the entire disclosure of which is incorporated by reference herein.

BACKGROUND OF THE INVENTION

The present invention relates to calibrating first and second signals to each other, and in particular, to a system for compensating a ramp signal by calibrating the ramp signal to the level of a compensating signal. In particular, the compensating signal may be the output of an error amplifier which produces a signal proportional to a difference between a voltage feedback signal of a power factor correction stage of a DC to DC converter and a reference signal. The ramp signal is utilized to control the pulse width modulation of the controlled output switch, for example, the power factor correction (PFC) output stage or the switch or switches of the DC to DC converter. In a typical application, the ramp signal is provided to one input of a PWM comparator and the other input of the comparator is provided with the output of the error amplifier whereby the output of the PWM comparator comprises a pulse width modulated signal whose duty cycle controls the switching of the output stage.

It is desirable to calibrate the ramp signal to the compensating signal, for example, the output of the error amplifier, in order to achieve high accuracy PFC.

A critical requirement in achieving near ideal Power Factor Correction (PFC) in a Single Cycle PFC Controller is to establish a Pulse Width Modulation (PWM) ramp waveform that represents the mathematical integration of an error voltage (COMP) on a cycle-by-cycle basis. The integration is reset to zero at the beginning of each switching clock cycle with the integration continuing throughout the entire cycle. The duration of one switching cycle is determined by the controller switching frequency. For a fixed COMP error voltage, the PWM ramp waveform will start at zero volts at the beginning of each switching cycle, linearly rise over the period, and then terminate at the COMP voltage at the completion of each cycle.

During operation, the COMP voltage is continually moving with input line frequency in an effort to provide the highest PFC quality. Since changes in the COMP voltage occur at a much slower frequency compared to the controller switching frequency, it is valid to assume the COMP voltage is "fixed". FIG. 1 below graphically details the desired RAMP waveform for two different COMP voltages, VCOMP 1 and VCOMP2. In each case, at the end of the cycle, it is desired that the ramp terminate at the level of the compensating voltage.

The difficulty arises when non-ideal circuit parameters such as op-amp offsets, circuit response times, package stress variations, temperature and process variations begin to introduce errors in the RAMP slope. Furthermore, a large contributor to ramp error in single cycle controllers (for example the IR1150) is that the user can program the switching frequency from 50 KHz to 200 KHz which means the RAMP slope needs to track a 4× change in frequency. This is difficult to implement under tight accuracy requirements due to mismatches between the oscillator and ramp capacitors, charge currents, circuit delays, and threshold voltages.

SUMMARY OF THE INVENTION

An object of the present invention is to have the ramp waveform utilized by the pulse width modulator terminate at a variable DC reference voltage, the compensating voltage, when the switching cycle is ending, for example, once the internal oscillator waveform reaches its maximum peak voltage. This peak voltage coincides with the oscillator maximum duty cycle. This maximum duty cycle is typically identified by a pulse. Accordingly, the compensating signal, for example, the output of the error amplifier, sets up the peak voltage of the ramp waveform. Since the frequency of the ramp waveform is fixed, the slope of the ramp waveform is thereby controlled so that the peak of the ramp coincides with the compensating voltage.

This calibration of the ramp waveform to the compensating signal is necessary for a proper power factor correction control in a power factor correction controller of the type described herein which operates on the single cycle control methodology. According to the single cycle control methodology, the power factor correction control operates with two control loops, an inner current loop and an outer voltage loop. The inner current loop is fast and does not require sensing of the input voltage in order to create a current reference.

This inner current loop sustains the sinusoidal profile of the average input current based on the dependency of the pulse width modulator duty signal on the input line voltage in order to determine the analogous input line current. Thus the current loop uses the embedded input voltage signal to control the average input current to follow the input voltage.

The outer voltage loop controls the DC bus voltage. This voltage is fed into the voltage error amplifier to control the slope of the integrator ramp and sets the amplitude of the average input current. The two loops combine to control the amplitude phase and shape of the input current with respect to the input voltage, giving near unity power factor.

The slope of the ramp is thus controlled to set the amplitude of the average input current. If the ramp terminates above or below the compensating voltage, the effects are increased harmonics seen at the output of the power factor controller which may result in inadequate and unacceptable levels of power factor correction.

According to the invention, the ramp charge current is actively modulated so that the ramp voltage crosses the compensating signal at the pulse coinciding with the oscillator maximum duty cycle. The ramp charge current is modulated by a variable current source. According to one embodiment, an up-down counter is utilized to control the switching of a plurality of weighted current sources controlling charging of the ramp capacitor, thereby modulating the charge current into the capacitor determining the ramp slope.

An advantage of the invention is that near ideal power factor correction is made possible over a wide range of operating frequencies using this cycle-by-cycle calibration scheme. Process, device mismatch and temperature variations are also calibrated out. The die area required for the circuit is relatively small, even for a bipolar process which is not efficient for implementing digital circuitry.

An alternative solution would have required trimming at wafer probe which adds test time and complexity, added die area for trim pads and fuses, and still trimming does not account for temperature variations, changes in oscillator frequency, or post-package stress induced shifts.

BRIEF DESCRIPTION OF THE DRAWING(S)

The invention will now be described in greater detail in the following detailed description in which FIG. 1 shows examples of ramp wave forms and compensating signals and their desired relationship;

Figure 4:
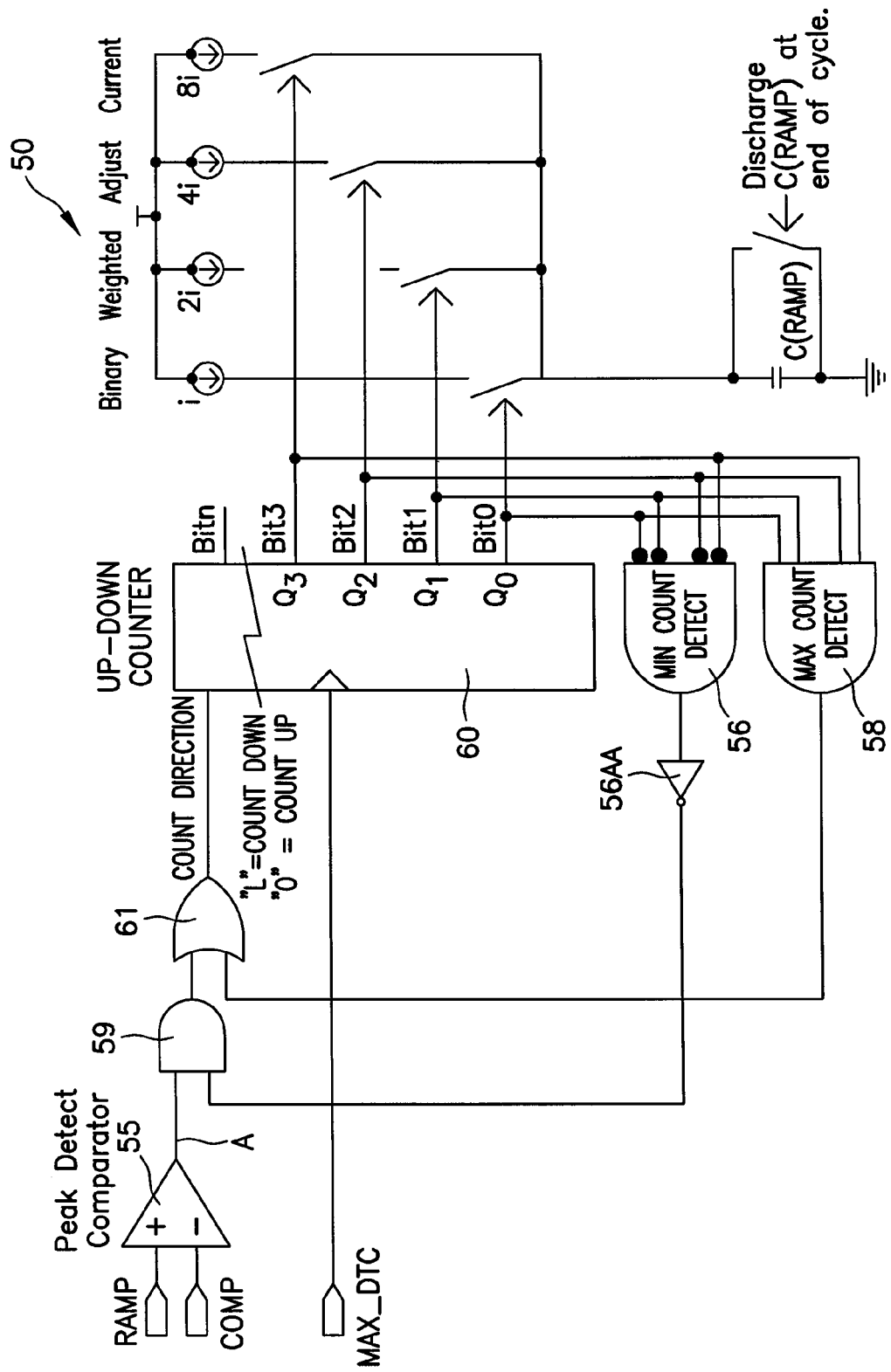
FIG. 4 shows a block diagram of the one embodiment of a circuit for controlling the ramp charging current.
Figure 6A:
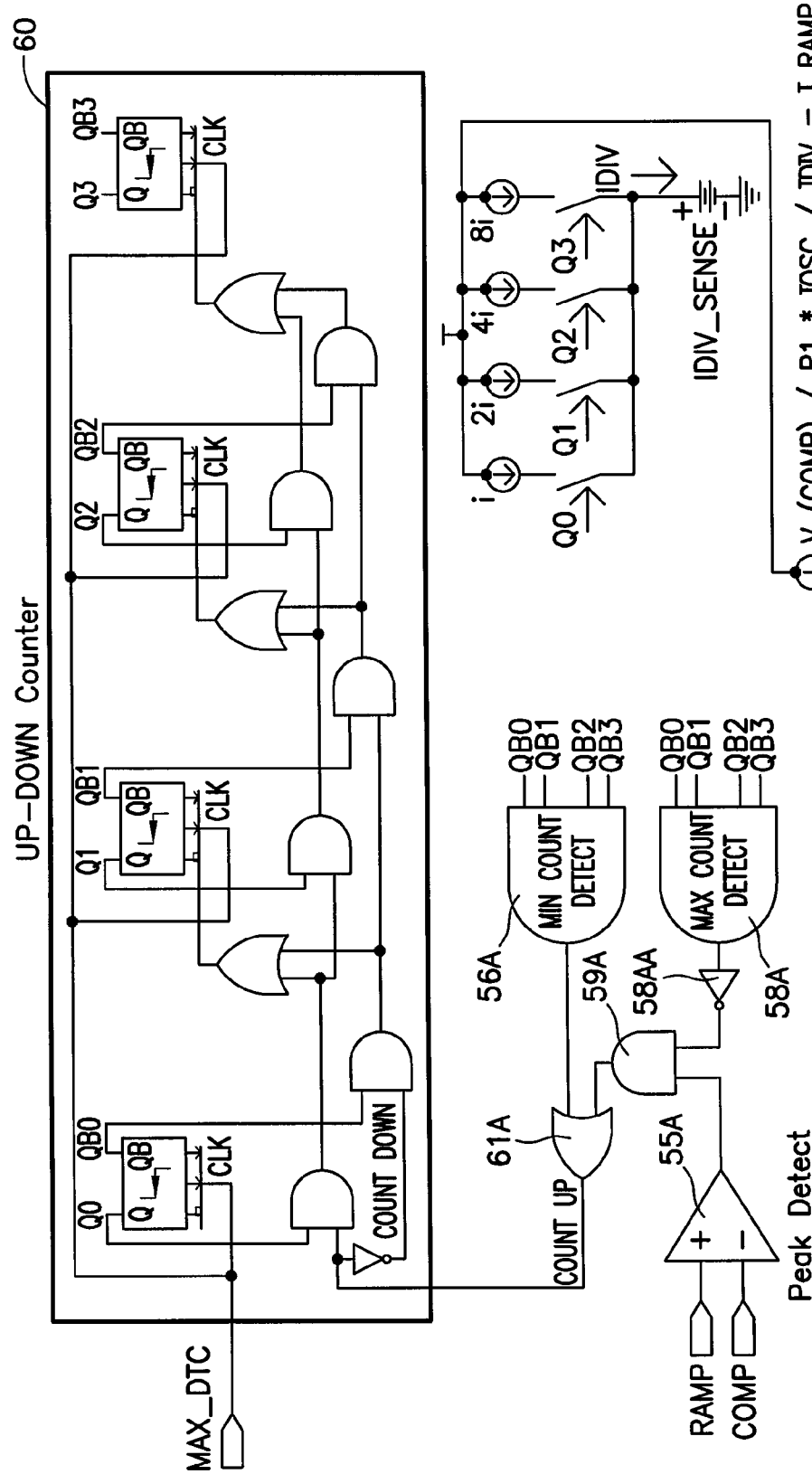
Figure 6B:
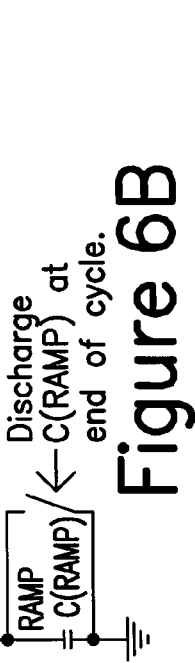
Figure 7:
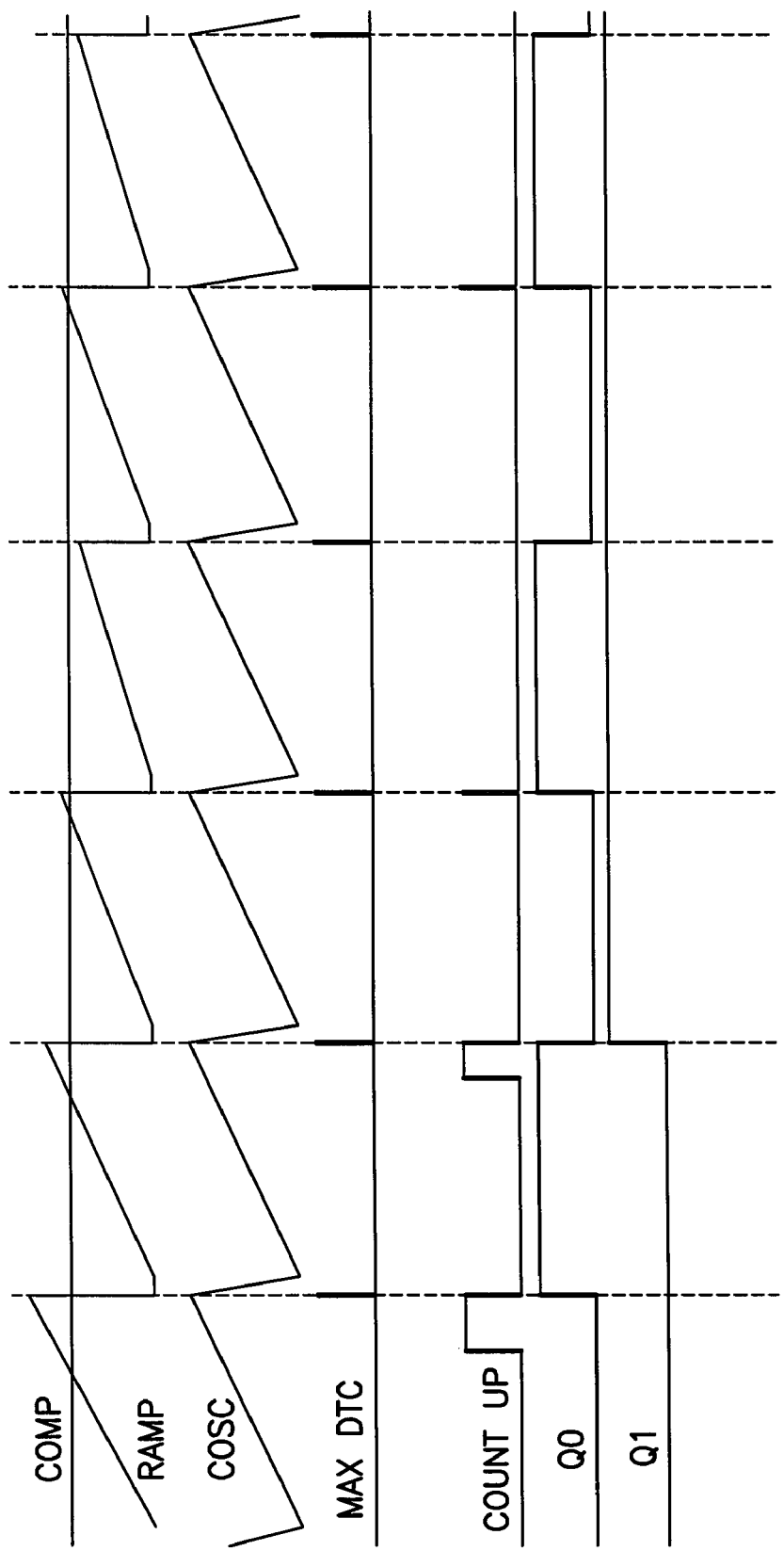

FIGS. 6A and 6B both show an alternative embodiment of the circuit of FIG. 4; and FIG. 7 shows waveforms of the circuit of FIG. 6.

DETAILED DESCRIPTION OF PREFERRED EMBODIMENTS OF THE INVENTION

Figure 1:
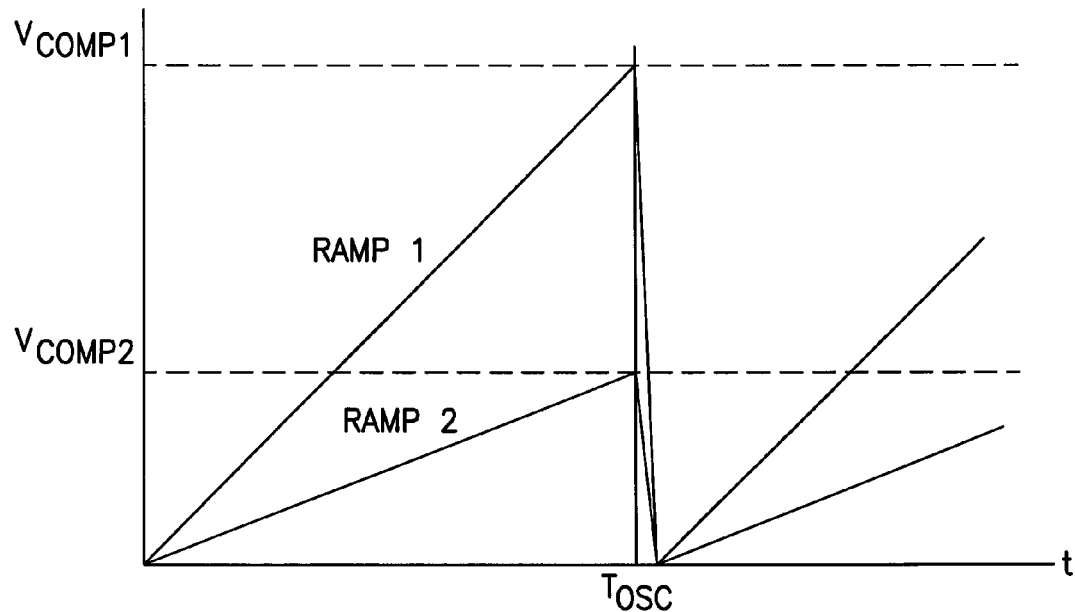
Figure 2:
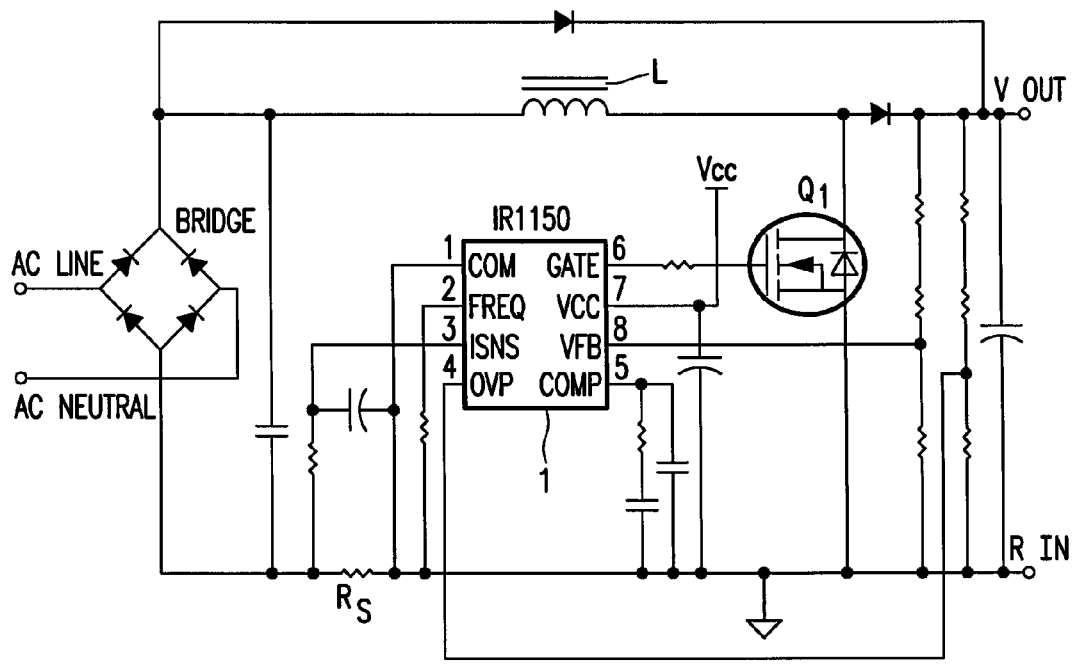
FIG. 2 shows an example of a power factor correction circuit having an integrated circuit therein employing the invention.

With reference now to the drawings, FIG. 2 shows a power factor correction controller employing an integrated circuit 1 which operates on the above-described single cycle control scheme. The IC 1 may be a type IR1150. The GATE output of the integrated circuit 1 is a pulse width modulated signal provided to the gate of the output stage transistor Q1 to control the switching action of transistor Q1 and thus force the input current and input voltage to be in phase, i.e., to have a power factor of nearly one. This reduces energy requirements and also reduces total harmonic distortion (THD). The circuit utilizes a current sense resistor $R_s$ for current sensing and a voltage feedback from the output to pin VFB.

Figure 3:
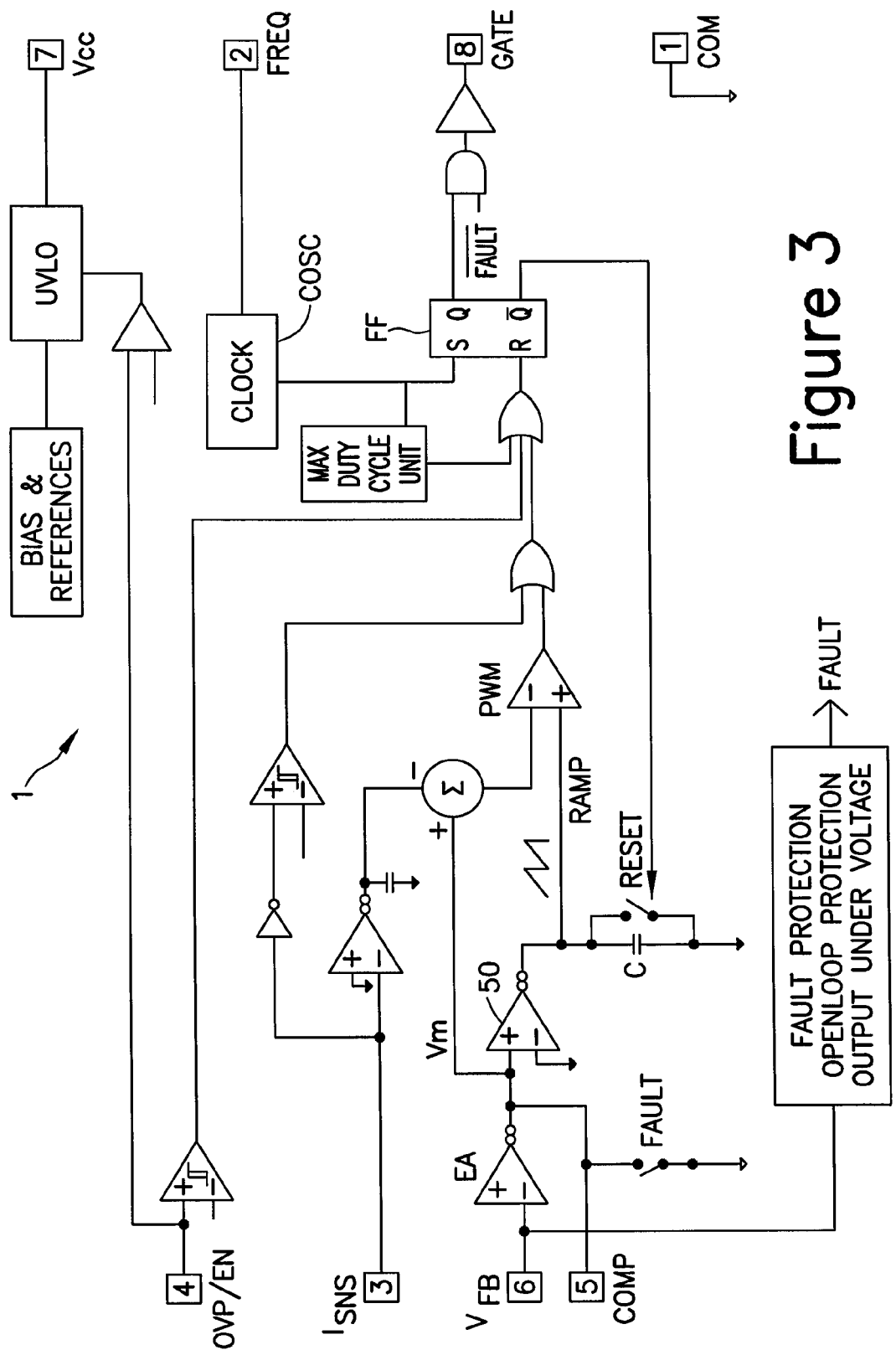
FIG. 3 shows the block diagram of the integrated circuit controller of FIG. 1.

FIG. 3 shows the block diagram of the IC 1. In relevant aspect, a voltage $V_{FB}$ is fed back from a resistor divider coupled across the output of the circuit of FIG. 2. The error amplifier EA compares the feedback voltage VFB to a reference voltage $V_{REF}$ and produces an error signal output $V_M$ proportional to the difference. This error signal is the compensating voltage COMP which is used to calibrate the ramp signal which is provided to the PWM comparator. The PWM comparator is indicated at PWM in FIG. 3. It compares the error amplifier output Vm summed with a signal related to the sensed inductor current to the RAMP oscillator signal, in particular, the ramp signal which is produced across the integrating charging capacitor C. The charging capacitor C is reset by a circuit FF at the end of each cycle of the system clock (CLOCK) thereby generating the ramp signal. The output of the PWM comparator is fed through succeeding circuits to control the gate of the switch Q1. A circuit 50 is used to control the charging rate of capacitor C and thus affect the ramp slope.

Turning to FIG. 4, this figure shows details of the circuit 50 shown in FIG. 3. In FIG. 3, circuit 50 comprising an amplifier stage is shown which controls the current sourced for charging the capacitor C. FIG. 4 shows details of the circuit. As shown in FIG. 4, the circuit 50 may comprise a plurality of weighted current sources I, 2I, 4I, 8I which are selectable based upon the count of a four bit UP/DOWN counter shown at 60. The outputs of the counter Q0, Q1, Q2, Q3 enable 16 currents to be selected based upon a count between 0 and 15. The currents from the current sources determine the current charging the capacitor, which thus controls the capacitor charge rate and thus ramp slope.

Figure 5:
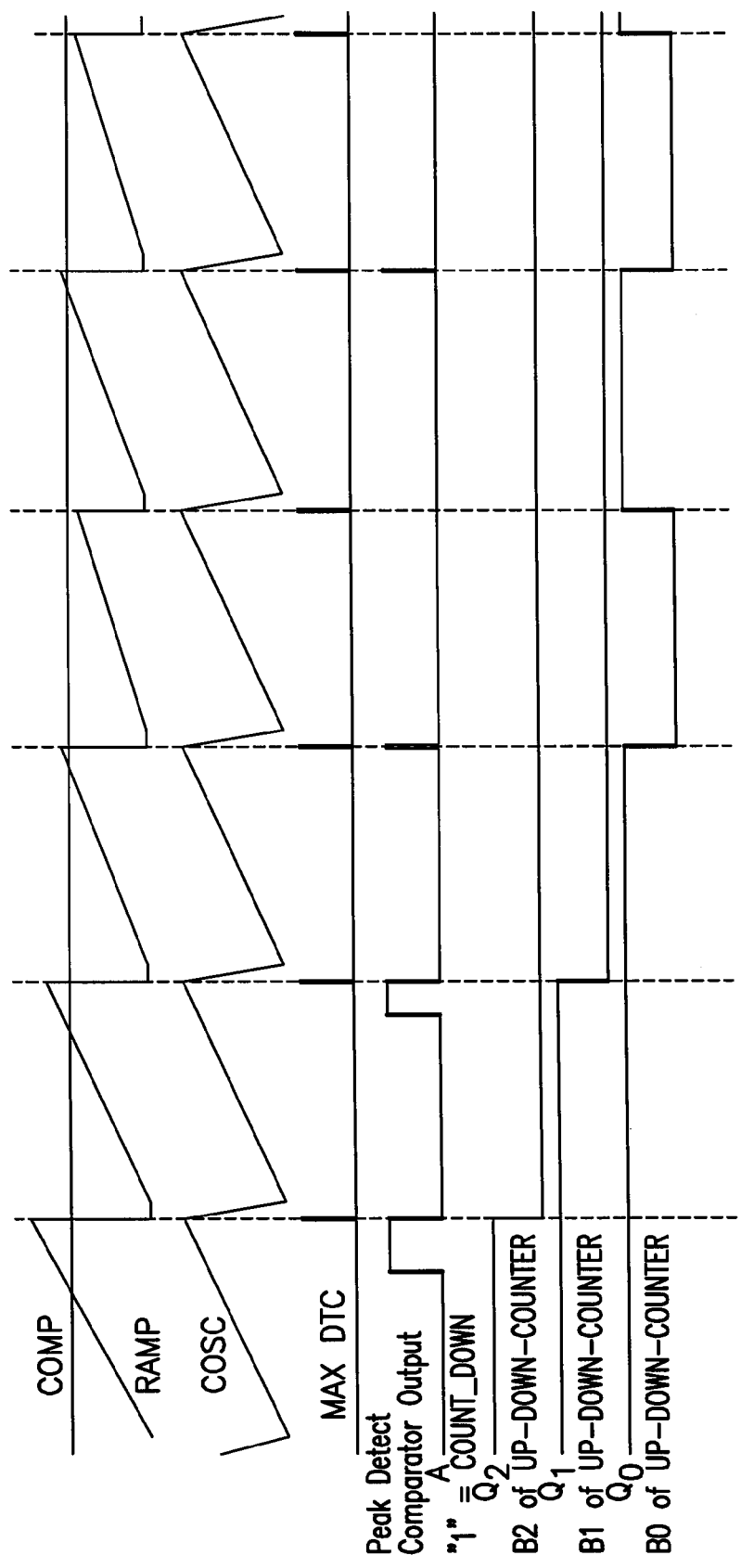
FIG. 5 shows waveforms in the circuit of FIG. 4.

As shown in FIG. 3, the compensating signal represents the output $V_M$ of the error amplifier. The ramp and comp signals are shown in FIG. 5. The aim is to calibrate the ramp signal so that it terminates at the variable DC COMP reference. The oscillator signal COSC is also shown in FIG. 5. Also shown is the signal MAXDTC which is a pulse generated when the oscillator maximum duty cycle or peak voltage has been achieved.

As shown in FIG. 4, the signal COMP and the ramp signal are provided to a comparator 55. The output of the comparator 55 is shown in FIG. 5 and comprises the signal A. Whenever the ramp exceeds the signal COMP, the comparator output goes high, as shown.

Referring to the block diagram in FIG. 4 and the timing diagram in FIG. 5, the end of the switching cycle is flagged by a MAX_DTC pulse which coincides with COSC reaching its peak voltage. The rising edge of the MAX_DTC pulse acts as a clock for the Up-Down Counter 60. The Peak Detect Comparator 55 provides a logic output that represents the instantaneous location of RAMP in relation to COMP. If RAMP exceeds COMP, the Peak Detect Comparator issues a high output. The digitized relationship of RAMP to COMP controls the count direction of the Up-Down Counter 60 whose binary outputs control the binary weighted adjust currents I, 2I, 4I and 8I. In the case of RAMP exceeding COMP at the generation of the MAX_DTC flag, the Peak Detect Comparator's "high" output directs the counter to count down by one bit. The resultant magnitude of the RAMP binary weighted current decreases so that the next cycle's RAMP slope will be less than the previous cycle. After several clock cycles, an ideal RAMP slope will be achieved and the Up-Down counter will toggle back and forth between the two nearest solutions. The MIN and MAX count detect gates 56 and 58 prevent the Up-Down counter from "rolling over" by keeping the binary output between all 0's and all 1's.

The maximum count detector 58 monitors when the maximum count (all 1's) of the counter 60 has been achieved. The minimum count detector 56 monitors when the minimum count (all 0's) has been achieved. Thus, when there is a minimum count (all 0's at the input to gate 56), the output of gate 56 is high. After inversion by inverter 56AA, whose output is low, AND gate 59 is disabled, preventing further counting down when there is a minimum count. AND gate 58 forces a count down when there is a maximum count (all 1's) since the output of OR gate 61 will be high, forcing a countdown.

Thus, the counter 60 selects the charging rate of the capacitor C, allowing one bit change in each load clock cycle (up or down) until the charging rate is such that the difference between the COMP signal and the ramp signal at the end of each clock cycle is minimized. This forces the ramp signal to the desired slope during the clock cycle.

FIG. 6 shows an alternate embodiment. In FIG. 6, the switched currents I, 2I, 4I and 8I are summed to generate IDIV which inversely controls the capacitor C charge current due to the current divider, that is IRAMP=V(COMP)/R1× IOSC/IDIV, where R1 is an internal resistor, not shown, IOSC is equivalent to the oscillator capacitor charge current and IVDIV is the current obtained by the selection of the current sources I, 2I, 4I and 8I to obtain the desired ramp amplitude.

The count control logic in FIG. 6 is opposite to account for the inverse effect of the switched current on the capacitor charge current. In FIG. 4, in contrast, a high output of the Peak Detect Comparator 55 issues a count down command to reduce the capacitor charge current to decrease the ramp slope. In FIG. 6, the similarly configured Peak Detect Comparator 55A issues that same high output when the ramp peak exceeds COMP. However, that high control signal issues a count up command to increase the denominator in the capacitor charge current IDIV to decrease the ramp slope. Since the count control logic is opposite, the min-max count detectors are also opposite and the logic circuitry 58AA, 59A and 61A is as shown in the illustrated embodiment.

FIG. 7 shows waveforms of the circuit of FIG. 6.

The four bit up-down counter 60 is thus used to control and select the ramp slope. The four bit outputs coincide with the binary weighted currents of the current modulator 50. The default charge current of the ramp signal is selected so that under ideal conditions, the four bit up-down counter is centered in its count, i.e., at approximately 7 to 8. If the ramp is above COMP at the maximum DTC clock, the count is increased by 1 which increases IDIV in the circuit of FIG. 6 thereby decreasing the ramp slope. In the circuit of FIG. 4, the count is reduced and the charging current is thus reduced. If the ramp is below the COMP voltage at maximum DTC, the count is decreased by 1 in the circuit of FIG. 6 thereby increasing the ramp slope. In the circuit of FIG. 4, when the ramp is below COMP, the counter counts up to increase the slope. The ramp will toggle in slope by one LSB (least significant bit) once the system has settled.

Counter rollover is prevented in each circuit (FIG. 4 and FIG. 6) by the maximum and minimum counters, i.e., the counters cannot count below zero or above 15.

In the circuit of FIG. 6, from I(RAMP)=V(COMP)/R1*IOSC/IDIV, an increase in IDIV results in a lower RAMP slope. Therefore if RAMP exceeds COMP, a COUNT-UP signal is issued to increase the binary weighted current which will decrease the slope on the next switching cycle. This is in contrast to the circuit of FIG. 4, where the current sources directly charge the capacitor, so that if RAMP exceeds COMP, a count down signal is issued to decrease the RAMP slope.

Thus the circuit of the present invention forces the RAMP signal (voltage across Capacitor C of FIG. 3) to calibrate itself to the COMP signal on a cycle-by-cycle basis, as shown by the timing diagrams of FIGS. 5 and 7. By modulating the current source circuit 50, the amount of current fed to the timing capacitor C is changed in accordance with the relationship of the COMP signal to the ramp signal. The slope of the ramp signal is modulated to insure the ramp signal terminates when it crosses the COMP signal.

Although the present invention has been described in relation to particular embodiments thereof, many other variations and modifications and other uses will become apparent to those skilled in the art. Therefore the present invention should not be limited by the specific disclosure herein, but only by the appended claims.

What is claimed is:

1. A circuit for calibrating an oscillating ramp signal to a variable DC reference signal comprising:
    a circuit for setting a predetermined time period during which a charging capacitor can charge and thus determining a ramp oscillator frequency;
    a variable current source for providing a charging current to the charging capacitor;
    a circuit for selecting the charging current fed by the variable current source to said charging capacitor; and
    a circuit for comparing the oscillating ramp signal to the variable DC reference signal and for supplying a signal to the selecting circuit for controlling the amount of current supplied to said charging capacitor thereby determining the charging voltage across said capacitor at the end of said predetermined time period.

2. The circuit of claim 1, wherein the circuit for comparing comprises:
    a comparator for comparing the oscillating ramp signal to the variable DC reference signal and for producing an output when a predetermined relationship between the oscillating ramp signal and the variable DC reference signal exists.

3. The circuit of claim 2, wherein the variable DC reference signal comprises the output of an error amplifier sensing the difference between a regulator output voltage and a reference level.

4. The circuit of claim 2, wherein the selecting circuit comprises a digital up/down counter for counting during the predetermined time period established by the circuit for setting the predetermined time period.

5. The circuit of claim 4, wherein the counter counts up or down by one bit during the predetermined time period.

6. The circuit of claim 4, wherein the variable current source comprises a plurality of selectable current sources selected by said up/down counter, and wherein said plurality of selectable current sources determine the charging current to said charging capacitor thereby to affect the slope of the oscillating ramp signal developed across said capacitor.

7. The circuit of claim 6, where the variable current source comprises a plurality of selectable current sources selected by said up/down counter, and wherein said plurality of selectable current sources modulate a current in a further current source providing charging current to said charging capacitor thereby to determine the charging current applied to said capacitor to affect the slope of the oscillating ramp signal developed across said capacitor.

8. The circuit of claim 7, wherein said plurality of selectable current sources and said further current source comprises a current divider determining the current provided by said further current source.

9. The circuit of claim 4, further comprising a circuit for preventing said up/down counter from counting below a minimum count and from counting above a maximum count.

10. The circuit of claim 5, wherein said counter counts by one bit up or down depending on a state of said output of said comparator at a time determined by a signal having said predetermined time period.

11. The circuit of claim 10, wherein said signal having a predetermined time period comprises a pulse signal identifying the end of said predetermined time period, said predetermined time period set by a system clock.

12. A method for calibrating an oscillating ramp signal to a variable DC reference signal comprising:
    setting a predetermined time period during which a charging capacitor can charge and thus determining a ramp oscillator frequency;
    providing a selectable charging current to the charging capacitor;
    selecting the charging current fed by the current source to said charging capacitor; and
    comparing the oscillating ramp signal to the variable DC reference signal and supplying a signal controlling the amount of current supplied to said charging capacitor thereby determining the charging voltage across said capacitor at the end of said predetermined time period.

13. The method of claim 12, wherein the step of comparing comprises:
    comparing the oscillating ramp signal to the variable DC reference signal and producing an output when a predetermined relationship between the oscillating ramp signal and the variable DC reference signal exists.

14. The method of claim 13, wherein the variable DC reference signal comprises the output of an error amplifier sensing the difference between a regulator output voltage and a reference level.

15. The method of claim 13, wherein the step of selecting comprises counting during the predetermined time period.

16. The method of claim 15, wherein the step of counting comprises counting up or down by one bit during the predetermined time period.

17. The method of claim 15, wherein the step of providing a selectable charging current comprises providing a plurality of selectable current sources, and further comprising selecting ones of said plurality of selectable current sources to determine the charging current to said charging capacitor thereby to affect the slope of the oscillating ramp signal developed across said capacitor.

18. The method of claim 17, where the step of providing a selectable charging current providing a plurality of selectable current sources, and further comprising selecting ones of said plurality of selectable current sources to modulate a current in a further current source providing charging current to said charging capacitor thereby to determine the charging current applied to said capacitor to affect the slope of the oscillating ramp signal developed across said capacitor.

19. The method of claim 15, further comprising preventing counting below a minimum count and from counting above a maximum count.

20. The method of claim 16, wherein said step of counting comprises counting by one bit up or down depending on the result of said step of comparing at a time determined by a signal having said predetermined time period.

21. The method of claim 20, wherein said signal having a predetermined time period comprises a pulse signal identifying the end of said predetermined time period, said predetermined time period set by a system clock.

* * * * *